United States Patent [19]
Averitt

[11] 3,757,500
[45] Sept. 11, 1973

[54] MULTIPLE UNIT LAWNMOWER CONSTRUCTION

[76] Inventor: Marnie C. Averitt, 107 Westdale Court, Timonium, Md. 21093

[22] Filed: Oct. 12, 1971

[21] Appl. No.: 188,267

[52] U.S. Cl............. 56/6, 56/11.6, 56/13.6, 56/14.9, 56/15.5, 56/17.2, 280/474, 280/490 R
[51] Int. Cl............................................ A01d 75/30
[58] Field of Search .................. 56/6, 7, 11.6, 13.6, 56/15.5, 15.6, 15.8, 14.9, 17.1, 17.2; 280/474, 490 R

[56] References Cited
UNITED STATES PATENTS

| | | | |
|---|---|---|---|
| 3,608,284 | 9/1971 | Erdman | 56/6 |
| 3,514,126 | 5/1970 | Fuss | 56/6 X |
| 3,068,630 | 12/1962 | Caldwell | 56/6 |
| 3,508,385 | 4/1970 | Carlson | 56/13.6 X |
| 3,612,575 | 10/1971 | Stewart | 280/474 |
| 2,771,730 | 11/1956 | True | 56/11.6 |
| 2,712,945 | 7/1955 | Peterson | 280/474 X |
| 3,599,406 | 8/1971 | Akgulian | 56/17.2 |
| 1,604,623 | 10/1926 | Whidden | 280/490 R |
| 2,847,232 | 8/1958 | Graham | 280/490 R |
| 2,072,473 | 3/1937 | Baumberger | 280/490 R |

Primary Examiner—Louis G. Mancene
Assistant Examiner—J. A. Oliff
Attorney—Joseph R. Slotnik

[57] ABSTRACT

A powered lawnmower comprising a powered tractor having a trailing mower assembly hitched thereto. The trailing assembly includes a frame detachably hitched to the tractor and having a plurality of rotary mower units secured thereto. In one embodiment, these mower units are positioned so that their cutting swaths overlap slightly with the cutting swath of a rotary mower unit supported upon the tractor. In another embodiment, the trailing assembly includes a plurality of rotary mower units which define a continuous cutting swath. In both embodiments, the mower units on the trailing assembly are powered independently of the tractor. In addition, the trailing assembly is vertically adjustable for different cutting heights, and the trailing mower units may be laterally adjustable for different cutting widths.

5 Claims, 11 Drawing Figures

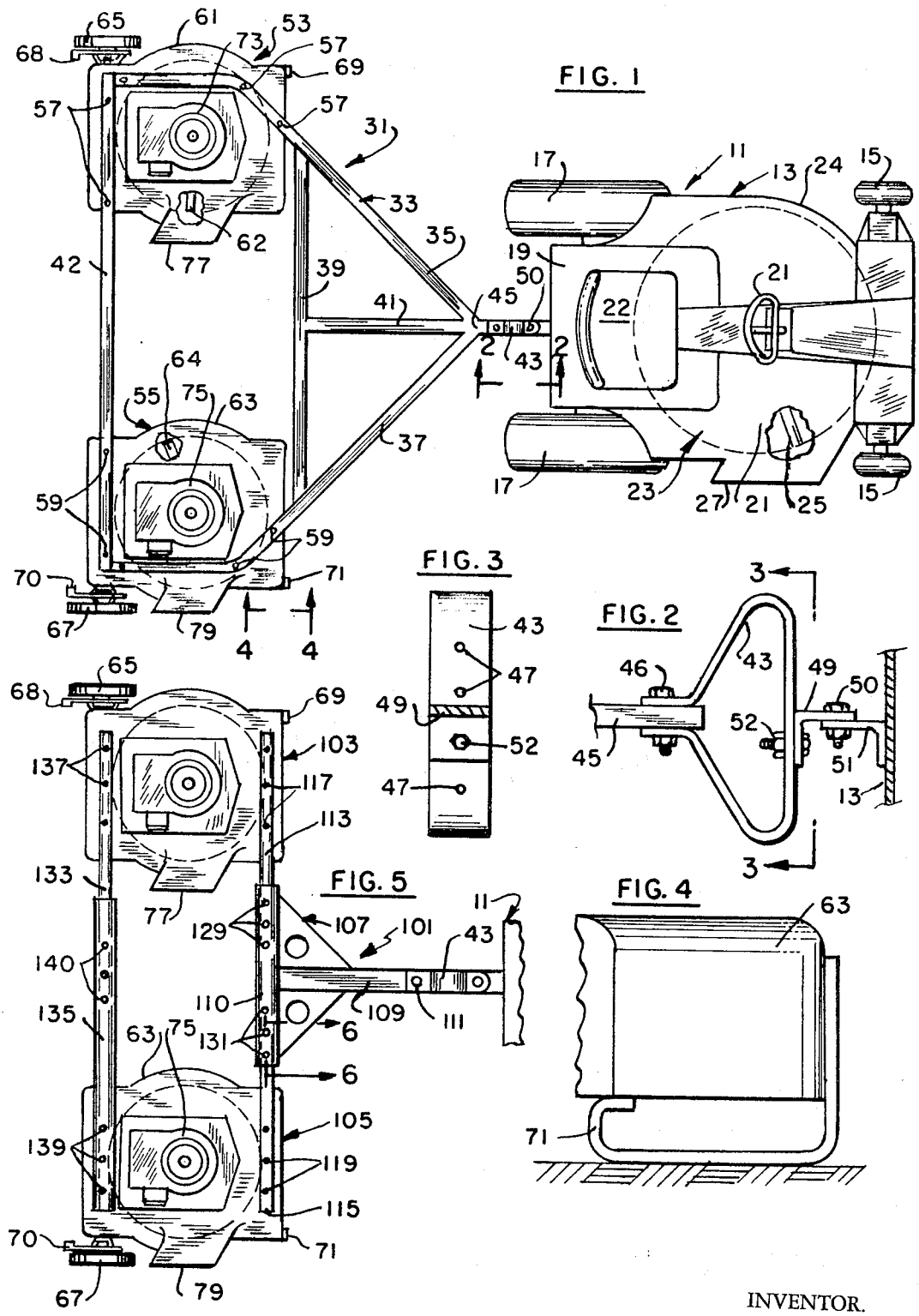

ical view of a portion of the left side of FIG. 8.
MULTIPLE UNIT LAWNMOWER CONSTRUCTION

SUMMARY OF THE INVENTION

The present invention is directed to a relatively simple and inexpensive lawnmower construction which readily converts a powered tractor to a multi-width, gang rotary mower. The inventive construction embodies a minimum of separate parts, is readily usable with a variety of different tractors, including those which are equipped with a rotary mower unit and those which are not, and may be adjustable for both different cutting heights and cutting widths. In addition, the inventive construction poses no unusual strain on the tractor or its prime mover and is powered in cutting independently from the power train for the tractor.

Main objects of the present invention, therefore, are to provide an improved rotary lawnmower construction which readily and inexpensively converts a conventional powered tractor into a multi-width, gang-type, rotary mower assembly and thereby greatly reduces the time required to mow a given area.

Further important objects of the present invention are to provide an improved gang-type lawnmower construction of the above character which requires only a simple hitch connection between the trailing mower assembly and the tractor, which requires no modification of the tractor power train or controls therefor, and which is readily adjustable for different cutting heights.

Additional important objects of the present invention are to provide an improved lawnmower construction of the above character readily usable with a wide variety of tractors including those which embody their own rotary mower unit and those which do not, and wherein when used with the former, may be adjustable in width for maximum efficiency.

Still further important objects of the present invention are to provide an improved lawnmower construction of the above character which requires no special skill in using, and which is safe and reliable in operation.

Other objects and advantages of this invention will become more apparent from a consideration of the detailed description to follow take in conjunction with the drawings annexed hereto.

BRIEF DESCRIPTION OF THE DRAWINGS

FIG. 1 is a plan view of a tractor and trailing assembly illustrating a preferred form of the invention;

FIG. 2 is an enlarged view of a portion of FIG. 1 taken along the line 2—2 thereof and looking in the direction of the arrows;

FIG. 3 is a sectional view of FIG. 2 taken along the line 3—3 thereof;

FIG. 4 is an enlarged view of a portion of FIG. 1 taken along the line 4—4 thereof and looking in the direction of the arrows;

FIG. 5 is a plan view of a trailing assembly illustrating a modified form of the invention;

BROAD STATEMENT OF THE INVENTION

Figure 7:
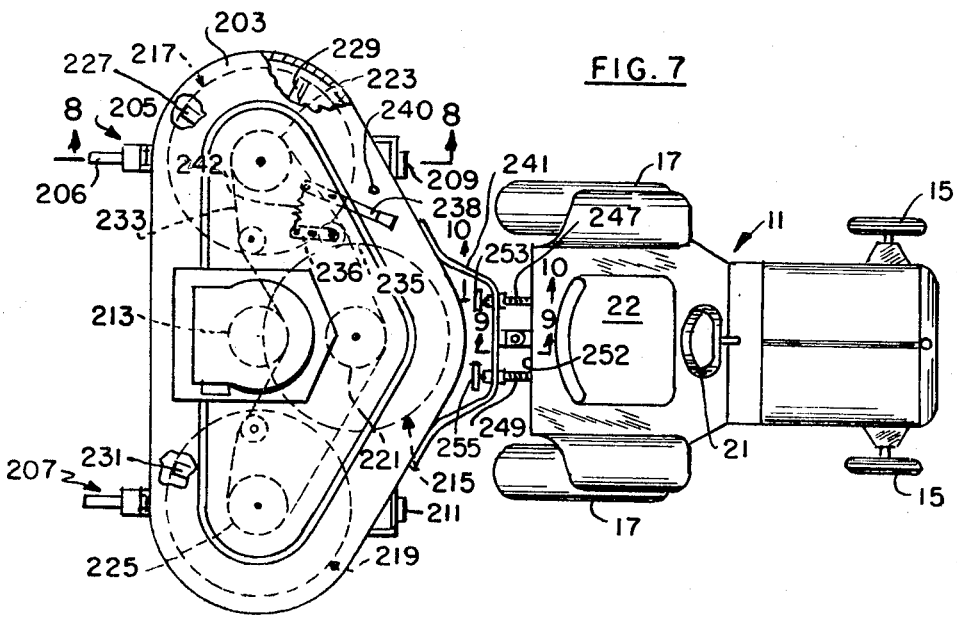
FIG. 7 is a plan view illustrating still another modified form of the invention.
Figure 8:
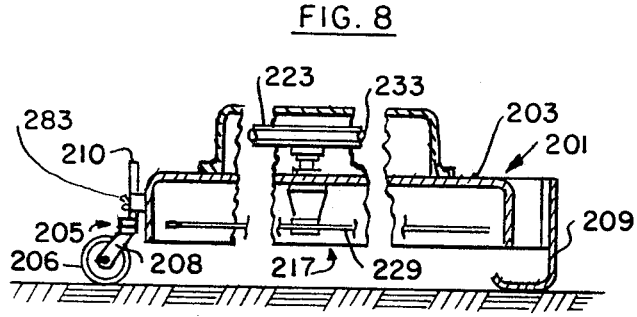
FIG. 8 is an enlarged sectional view of FIG. 7 taken along the line 8—8 thereof.
Figure 9:
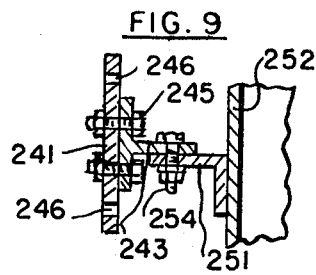
FIG. 9 is an enlarged sectional view of FIG. 7 taken along the line 9—9 thereof.
Figure 11:
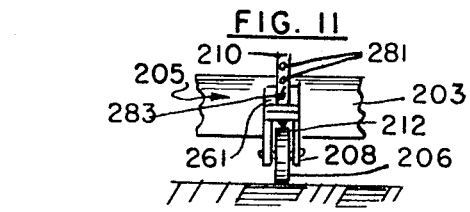
FIG. 11 is an elevational view of a portion of the left side of FIG. 8.
Figure 10:
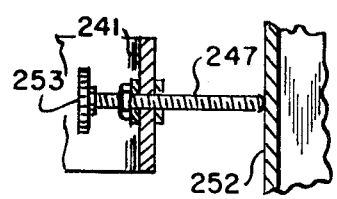
FIG. 10 is an enlarged sectional view of FIG. 7 taken along the line 10—10 thereof.

Broadly described, the present invention relates to a lawnmower construction comprising a powered tractor including a frame supported for movement along the ground by wheels, a rotary mower unit supported by said tractor frame and located substantially midway of the width thereof, first drive means on said tractor frame powering said tractor and said mower unit, steering means on said tractor frame for controlling the direction of movement of said tractor, a trailing assembly including a rigid frame pivotally attached to the rearward portion of said tractor frame for movement about a generally vertical axis, and a pair of rotary mower units fixedly secured to said rigid trailing frame and disposed on opposite sides of said tractor mounted mower unit, said frame and said trailing mower units pivoting unitarily relative to said tractor frame, said trailing mower units and said tractor unit defining a continuous cutting swath for all pivoted positions of said trailing frame, and second drive means on said trailing assembly and independent of said first drive means and powering said trailing mower units.

In another aspect, the present invention relates to a lawnmower construction comprising a powered tractor including a frame supported for movement along the ground by wheels, a rotary mower unit supported by said tractor frame and located substantially midway of the width thereof, first drive means on said tractor frame powering said tractor and said mower unit, steering means on said tractor frame for controlling the direction of movement of said tractor, a trailing assembly including a rigid frame pivotally attached to the rearward portion of said tractor frame for movement about a generally vertical axis, and a pair of rotary mower units fixedly secured to opposite outboard portions of said rigid trailing frame and disposed on opposite sides of said tractor mounted mower unit, said trailing frame including first and second adjustably secured members for elongating said frame and varying the spacing between said trailing mower units, said frame and said trailing mower units pivoting unitarily relative to said tractor frame, said trailing mower units and said tractor unit defining a continuous cutting swath for all pivoted positions of said trailing frame, and second drive means on said trailing assembly and independent of said first drive means and powering said trailing mower units.

DETAILED DESCRIPTION

Referring now more specifically to the drawings, a tractor illustrated generally at 11 in FIG. 1 is seen to include a tractor frame 13 supported for movement over the ground by front and rear wheels 15, 17, respectively. A prime mover 19 is mounted on the tractor frame 13 to drive the tractor, and a steering wheel 21 is provided to turn the wheels 15 and thereby control the direction of movement of the tractor 11. A seat 22 is provided on the frame 13 for the operator.

A rotarp mower unit 23 is supported upon the frame 13 and includes a housing 24 having one or more rotary blades 25 (one being shown) supported for rotation through a generally horizontal plane. The blade 25 is powered by the prime mover 19 which is connected thereto by a suitable transmission, and, when the blade 25 rotates and the tractor 11 is moved over the ground, grass is cut by the blade 25 and is discharged through a discharge opening 27 in the housing 24.

It will be appreciated that there is a practical limit to the cutting width provided by the tractor unit 23. Thus, even in the case of tractor units 23 employing multiple blades, their cutting width generally does not exceed 36 inches, partly because of the need for a safe area for the operator to step in when mounting and demounting the tractor. In an effort to increase this cutting width, and correspondingly reduce the overall cutting time for a given area, it has been proposed to utilize a trailing assembly having one or more rotary mower units attached thereto. However, these have not met with wide acceptance likely because they have not been easy to handle and manipulate, and have greatly reduced the maneuverability of the tractor. In addition, these trailing assemblies generally have not been sufficiently versatile to accomodate different cutting heights and use with different types of tractors and tractor powered mowers, and they have generally been somewhat expensive.

A preferred form of trailing mower assembly constructed according to the present invention is illustrated generally at 31 and is seen to include a frame 33 made up of structural members 35, 37, 39 forming an "A" frame, and rigidifying braces 41, 42. A hitch bracket 43 is secured to a forward frame post 45 by bolts 46 and is provided with a plurality of vertically spaced openings 47. A tractor hitch 49 is pivoted by a king pin 50 to a standard apertured hitch plate 51 rigid with the tractor frame 13 and is adjustably secured to the hitch bracket 43 by a bolt 52 extending through one of the openings 47.

A pair of trailing mower units 53, 55 are fixed to the frame members 35, 37 at opposite sides of the trailing frame 33 by bolts 57, 59, respectively. The units 53, 55 include inverted cup shaped housings 61, 63 supported for movement over the ground by wheels 65, 67 at their rear end, and by generally U-shaped skids 69, 71 at their front end, respectively. The units 53, 55 also include gasoline engines 73, 75 supported atop the housings 61, 63 and powering rotary blades 62, 64 disposed beneath the housings 61, 63, respectively. Discharge openings 77, 79 in the side of the deck housings 61, 63 allow free discharge of grass cuttings from the units 53, 55.

The trailing mower units 53, 55 are spaced apart a distance such that the cutting swaths of their blades overlap slightly with the cutting swath of the tractor unit blade 25 for all positions of the trailing assembly 31 relative to the tractor 11. It has been determined that with the structure illustrated, the space between the swaths of blades 62, 64 should be from about five to about 6 inches less than the width of the swath of blade 25. Thus, using a 36 inch unit 23, and two 18 inch units 53, 55, a total cutting swath of 66 inches is achieved.

As described above, the hitch bracket 43 is vertically adjustably secured to the tractor hitch plate 51 by means of the adjustable hitch 49. The wheels 65, 67 are also vertically adjustable relative to the deck housings 61, 63 (and to the frame) by means of conventional, manually operable detent levers 68, 70, respectively. Desirably, the openings 47 in bracket 43 are coordinated with the various settings of detent levers 68, 70 so that the blades of units 53, 55 can remain parallel to the ground for all cutting heights. The skids 69, 71 may also be adjustable or may, as shown, be permanently fixed to the deck housings 61, 63 as by welding, and at a height so as to touch the ground when the units 53, 55 are set for their lowest cut. The primary purpose of the skids 69, 71 is to minimize "scalping" and to assist in stabilizing the trailing assembly 31.

In use, the trailing assembly 31 is set for the desired cutting height (corresponding to the cutting height of the tractor unit 23) by adjusting wheels 65, 67 and the hitch 49, and thereafter attached to the tractor 11 by the king pin 50. The mower engines 73, 75 are started and the tractor engine 19 started and the tractor clutch engaged.

As the tractor 11 moves, grass is cut by the tractor unit 23 and by the flanking trailing units 53, 55 thereby providing a continuous cutting swath across the entire width of these units. As the tractor 11 turns, so does the trailing assembly 31, and the trailing assembly will always tend to "right" itself since it basically is a balanced and symmetrical arrangement.

Of primary importance here is the easy attachment and detachment of the trailing assembly 31 to the tractor 11, the separate motors 73, 75 for the trailing mower units 53, 55, the cutting height adjustment for the trailing mower units, and the ability of the tractor and trailing assembly to perform with greatly increased cutting speed with minimal reduction in tractor performance and/or maneuverability.

Figure 6:
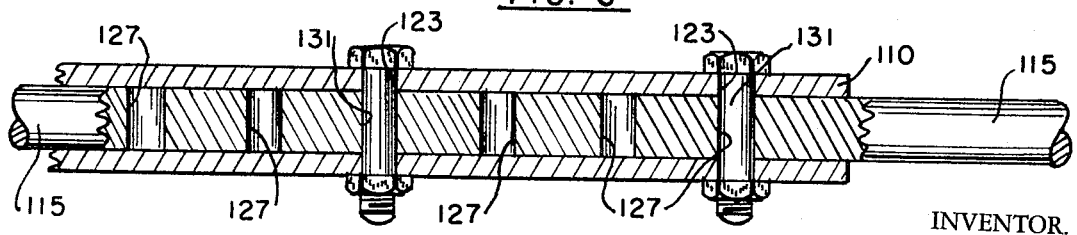
FIG. 6 is an enlarged sectional view of FIG. 5 taken along the line 6—6 thereof.

A modified form of the invention is shown in FIGS. 5 and 6. Here, a trailing assembly 101 includes a pair of conventional gasoline powered, rotary mower units 103, 105 attached by a frame 107 to a tractor 11. The frame 107 includes a T-bar 109, 110 fixed by bolts 111 to a hitch bracket 43 similar to the one illustrated and described above. The frame 107 also includes a pair of arms 113, 115 telescopically received in the crosspiece 110 of the T-bar and fixed at their outer ends to the mower units 103, 105 by bolts 117, 119. As shown, the cross-piece 110 has spaced openings 123 (FIG. 6) therein adapted to selectively align with openings 127 in the arms 113, 115, and locking bolts 129, 131 extend through these aligned openings to secure the arms 113, 115 to the cross-piece 110. In this manner, the mower units 103, 105 can be selectively spaced apart in accordance with the cutting width of the tractor unit 23. In actual practice, the cutting width of tractor unit 23 can vary as much as 14 inches, so that an adjustment of seven inches for each arm 113, 115 can accomodate this.

To insure adequate stability, a pair of telescoping braces 133, 135 have their ends secured by bolts 137, 139 to the rear ends of the mower units 103, 105. Also, these braces 133, 135 have spaced openings adapted to align in the same manner as openings 123, 127 in crosspiece 110 and arms 113,115, respectively. Locking bolts 140 secure the braces 133, 135 together in their adjusted position.

As described above for the embodiment of FIGS. 1—4, the mower units 103, 105 are vertically adjustable by means of suitable detent levers 68, 70 upon which are mounted the wheels 65, 67 and which are pivoted upon the mower units 103, 105. Similarly, the bracket 43 is vertically adjustable relative to the hitch 49 so that for all adjusted positions of the mower units 103, 105, their blades can remain parallel to the ground. In all other respects, the construction of FIGS. 5 and 6 corresponds to that of FIGS. 1—4 so that like numerals refer to like parts.

A further modified form of the invention is illustrated in FIGS. 7–11. Here, the trailing assembly 201 comprises a frame or deck 203 supported for movement over the ground by casters 205, 207 and skids 209, 211. Each of the casters 205, 207 includes a wheel 206 carried by an arm 208 pivoted to a bracket 210 by a rivet 212. The skids 209, 211 are stationary. The frame 203 has a gasoline engine thereon driving a pulley 213. Three rotary blade units 215, 217, 219 are disposed in staggered relation beneath the frame 203, the unit 215 being centrally disposed and the units 217, 219 being behind and to either side of the unit 215.

The blade units 215, 217, 219 include pulleys 221, 223, 225 and blades 227, 229, 231, respectively. A belt 233 interconnects the driving pulley 213 with the blade pulleys 221, 223, 225. An idler pulley 235 mounted upon a pivoted lever 236 serves as a clutch to selectively connect and disconnect the driving and driven pulleys. An operating lever 238 is connected to the lever 236 by a tension spring 242 and, when the lever 238 is pivoted to the position shown in FIG. 7, it acts through the spring 242 to bias the pulley 235 into clutching engagement with the belt 233. When pivoted in a counterclockwise direction from that shown in FIG. 7, the lever 238 serves to disengage the pulley 235 from the belt 233. Abutments 244, 246 limit movement of the lever 238, while detent means 240 holds the lever 238 in the clutching and declutching positions.

The frame 203 has a structural plate 241 provided with a plurality of vertically spaced openings 246. A hitch 243 is adjustably fixed to the plate 241 by bolts 245 adapted to extent through selected ones of the openings 246. The hitch also is fixed by a bolt 254 to a tractor hitch 251 rigid with a tractor structural plate 252. The structural plate 241 also has a pair of jack screws 247, 249 extending forwardly therefrom and adapted to abut the structural plate 252 on the tractor 11. The screws 247, 249 have knurled heads 253, 255 by means of which the screws can be manually tightened against the tractor plate 251. When so positioned, the screws 247, 249 prevent the trailing assembly 201 from pivoting relative to the tractor 11. The pivoted casters 205, 207 allow the trailing assembly 201 to turn freely as the tractor is turned.

To facilitate cutting height adjustment in this trailing assembly 201, each caster bracket 210 is guided in a channel 261 and has a plurality of vertically spaced openings 281. A bolt (not shown) fixed to the frame 203 is adapted to extend through a selected opening 281 in each bracket 210, and the latter is held in place by a wing nut 283 threaded on the end of the bolt. The openings 281 in the caster brackets 210 are spaced substantially the same as the openings 246 in the plate 241 so that the frame 203 and the mower units 215, 217, 219 can remain parallel to the ground for all adjusted positions. Again, the skids 209, 211 are positioned to touch the ground at the lowest adjusted position of the frame 203, and function to minimize scalping and enhance stability.

This trailing assembly 201 is useful with all types of tractors, but is particularly adapted for use with a tractor which does not have its own mower. Regardless of whether the tractor 11 has its own mower, the staggered mower units 215, 217, 219 in the trailing assembly 201 provide a continuous cutting swath. Furthermore, the easy turning casters 205, 207, and the non-pivoting connection between the trailing assembly 203 and the tractor 11 allows the trailing assembly to follow very closely behind the tractor and does not require clearance therebetween to allow for pivoting when the tractor 11 is turned.

By the foregoing, there has been disclosed an improved powered lawnmower construction calculated to fullfill the inventive objects herein set forth, and while preferred embodiments of the invention have been illustrated and described in detail above, various additions, substitutions, modifications, and omissions may be made thereto without departing from the spirit of the invention.

I claim:

1. A lawnmower construction comprising a powered tractor including a frame supported for movement along the ground by wheels, a rotary mower unit supported by said tractor frame and located substantially midway of the width thereof, first drive means on said tractor frame powering said tractor and said mower unit, steering means on said tractor frame for controlling the direction of movement of said tractor, a trailing assembly including a rigid frame pivotally attached to the rearward portion of said tractor frame for movement about a generally vertical axis and a pair of rotary mower units fixedly secured to said rigid frame and disposed substantially outboard of and on opposite sides of said tractor mounted mower unit, said frame and said trailing mower units pivoting unitarily relative to said tractor frame, said trailing mower units and said tractor unit defining a continuous cutting swath for all pivoted positions of said trailing frame, and second drive means on said trailing assembly and independent of said first drive means and powering said trailing mower units.

2. A construction as defined in claim 1 wherein said trailing assembly includes wheels vertically adjustable relative to said trailing frame, said trailing frame being vertically adjustable relative to said tractor frame, whereby to adjust the cutting height of said trailing mower units.

3. A construction as defined in claim 2 wherein said wheels are disposed at the rear of said trailing mower units, said trailing mower units having skids adjacent the front thereof.

4. A lawnmower construction comprising a powered tractor including a frame supported for movement along the ground by wheels, a rotary mower unit supported by said tractor frame and located substantially midway of the width thereof, first drive means on said tractor frame powering said tractor and said mower unit, steering means on said tractor frame for controlling the direction of movement of said tractor, a trailing assembly including a rigid frame pivotally attached to the rearward portion of said tractor frame for movement about a generally vertical axis, and a pair of rotary mower units fixedly secured to opposite outboard portions of said rigid trailing frame and disposed substantially outboard of and on opposite sides of said tractor mounted mower unit, said trailing frame including first and second adjustably secured members for elongating said frame and varying the spacing between said trailing mower units, said frame and said trailing mower units pivoting unitarily relative to said tractor frame, said trailing mower units and said tractor unit defining a continuous cutting swath for all pivoted positions of said trailing frame, and second drive means on said trailing assembly and independent of said first drive means and powering said trailing mower units.

5. A construction as defined in claim 4 wherein said first and second members are telescoped to form said adjustment for the trailing mower units.

* * * * *